United States Patent

[11] 3,599,048

[72] Inventor Frank M. Olin
R.R. #18, Box 361, Indianapolis, Ind. 46224
[21] Appl. No. 31,268
[22] Filed Apr. 23, 1970
[45] Patented Aug. 10, 1971

[54] LIGHTING CONTROL SYSTEM
9 Claims, 3 Drawing Figs.

[52] U.S. Cl. .................................................... 317/124,
307/117, 307/141.8, 250/237, 250/239
[51] Int. Cl. ........................................................ H01j 39/12,
H05b 37/00, H01h 47/24
[50] Field of Search.......................................... 317/124;
250/237, 239; 315/149, 159; 307/117, 141.8

[56] References Cited
UNITED STATES PATENTS
3,350,581 10/1967 Stein, Jr. ......................... 317/124 X
3,366,800 1/1968 Everard ......................... 307/117
3,404,282 10/1968 Walker ......................... 250/222

Primary Examiner—Lee T. Hix
Attorney—Hood, Gust, Irish, Lundy & Coffey

ABSTRACT: A control system comprising first circuit means including light-actuated means and first switch means cooperating to provide a first circuit condition in the presence of light and a second circuit condition in the absence of light, load switch means effective, when operated, to energize a load, second switch means connected in parallel with the said first switch means and effective, when operated, to bypass and disable the first switch means, and a timer. The timer, which may be a motor-driven, cam-operated timer, includes timer control switch means and load control switch means. The control system is arranged so that, once the timer is started by the first circuit means changing from its first circuit condition to its second circuit condition, the load is energized and the second switch means is operated to bypass the first switch means so that changes in the electrical condition of the light-actuated means have no effect on the system.

PATENTED AUG 10 1971          3,599,048
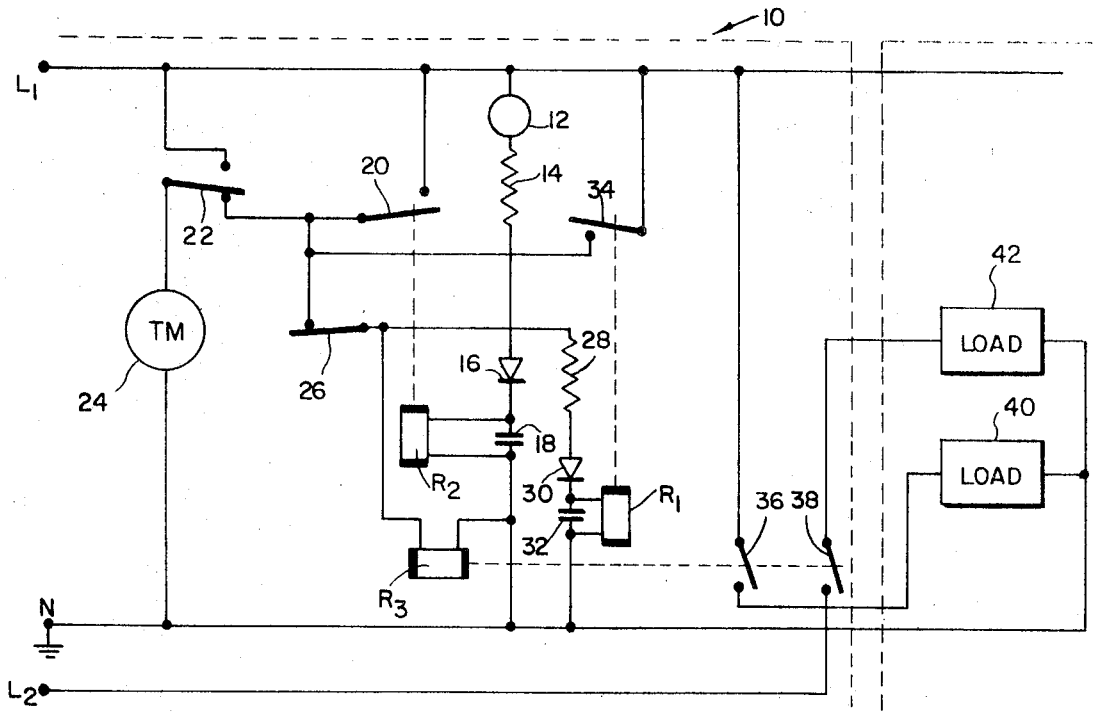
Fig.1
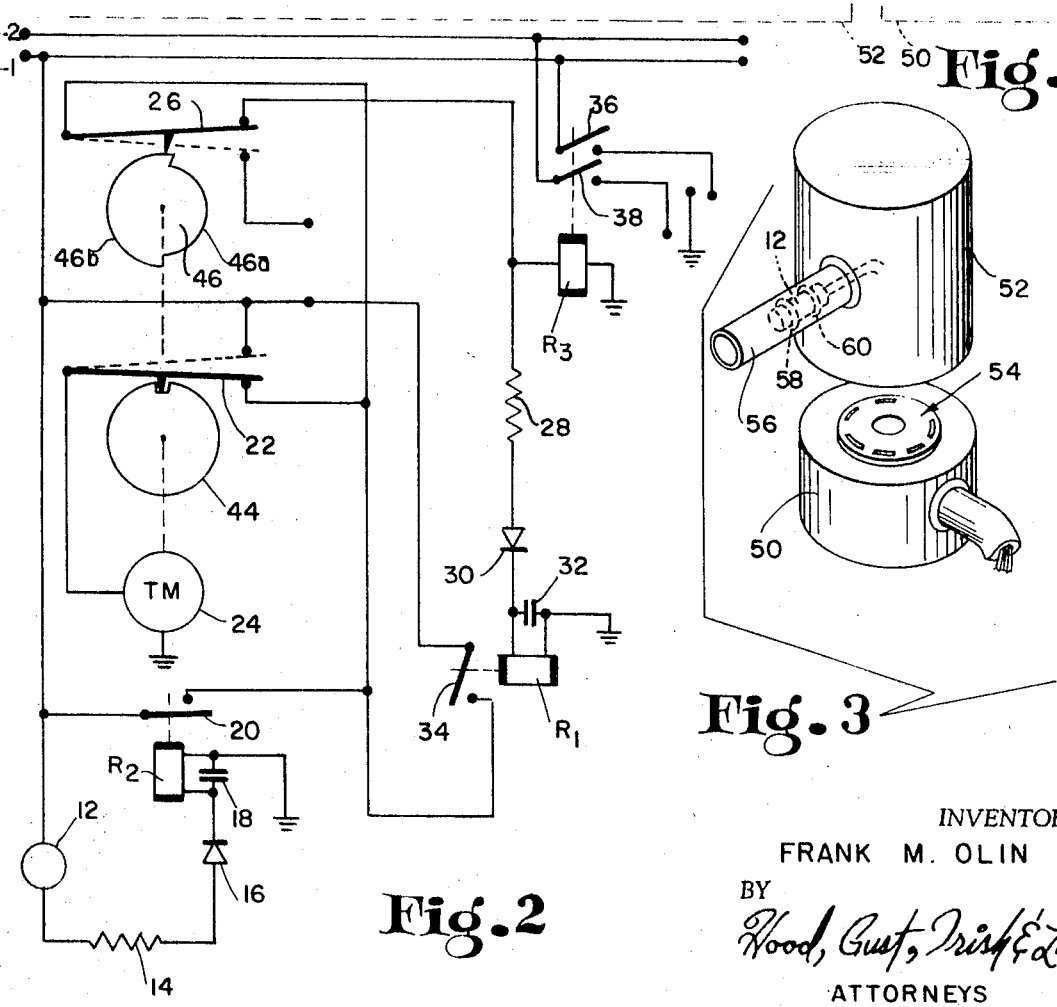
Fig.2
Fig.3
INVENTOR.
FRANK M. OLIN
BY
Hood, Gust, Irish & Lundy
ATTORNEYS

LIGHTING CONTROL SYSTEM

It is a primary object of may invention to provide a simple and inexpensive, yet extremely effective system for controlling lighting. My system is particularly suited for use in automatically controlling and operating outdoor advertising systems which utilize light, parking-lot lighting systems, street-lighting systems, and the like.

My system is constructed so that the timing function is obtained by using a very inexpensive and readily available timer which is referred to in the trade as an industrial timer. This timer is not a continuously running clock-type timer that operates 24 hours a day every day as long as it is energized. The timer in my system starts operating when there is a change in light density in the area surrounding the system and it continues to operate for a preselected period of time, after which it turns itself off to begin operation again only when there is a similar change in light density.

Particularly, my control system comprises first circuit means including light-actuated means, such as a conventional photocell, and first switch means cooperating to provide a first circuit condition in the presence of light and a second circuit condition in the absence of light, load switch means effective, when operated, to energize a load, second switch means connected in parallel with the said first switch means and effective, when operated, to bypass and disable the first switch means, and a timer. The timer includes its own timer control switch means and a load control switch means, the timer control switch means having a running condition effective directly to energize and operate the timer from a power source for a first predetermined period of time and an alternate starting condition effective to energize and initiate operation of the timer through the said first switch means for operation during said first period of time. The load control switch means of the timer has a condition effective to operate the load switch means and the said second switch means for a second predetermined period of time running during and within the time span of said first period of time and an alternate condition effective to disable the load switch means and the second switch means.

One of the problems with conventional lighting control systems utilizing photocells is that it is difficult to adjust the sensitivity of the system relative to changes in light density. I have accomplished this sensitivity control by placing my photocell in a horizontally extending tube having an open, outer end with the light-responsive surface of the cell facing the open end. I then place conventional O-rings about the cylindrically shaped photocell, which O-rings frictionally engage the internal diameter of the tube to position the cell. The sensitivity of the system is, therefore, adjusted by selectively adjusting the axial position of the photocell within the tube.

In this description and in the claims appended hereto, the term "switch means" is intended to include control-type switches, such as relays and silicon-controlled rectifiers, which are rendered either conductive or nonconductive by the application of control signals thereto. For instance, a relay includes a field coil and a contact member which is spring urged either normally closed or normally open in opposition to the magnetic force produced by current flow through the field coil. A silicon-controlled rectifier is an electronic analogy of a relay in that it can be rendered conductive between its anode and cathode by control signals applied to its gate electrode.

Other objects and features of my present invention will become apparent as this description progresses.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 1 is a functional schematic of my entire system showing the loads in block form;

FIG. 2 is a functional schematic showing, in some greater detail, the manner in which the timer operates switches; and FIG. 3 is a fragmentary exploded perspective view showing the manner in which I prefer to package my system.

Referring now to FIG. 1, it will be seen that may illustrative system, indicated generally at 10, includes three relays $R_1$, $R_2$, $R_3$. The circuitry is illustrated as being connected across power service indicated at $L_1$, $L_2$, N. Conventionally, the neutral powerline N is connected to ground as indicated.

I have a light-sensing circuit connected across $L_1$, N as illustrated in FIG. 1, this circuit including, in series, a photocell 12, resistor 14, diode 16, and the field coil of relay $R_2$. This is the first circuit means referred to previously. I prefer to place a capacitor 18 across the field coil of relay $R_2$ to keep the contacts of the relay from chattering. This technique, of course, is conventional. The photocell 12 which I prefer to use is a cell which will handle up to 220 volts and which will conduct in the presence of light. When the cell 12 conducts, current flows through resistor 14, diode 16, and the field coil of relay $R_2$ to energize the relay to hold its switch 20 open. That is, during the day, when the photocell 12 sees light, the switch 20 stays open. At dusk, the cell 12 stops conducting, the relay $R_2$ is deenergized, and the switch 20 is then closed by means of a conventional spring incorporated within the relay. Once the switch 20 is closed, current can flow from $L_1$, through the switch 20, another switch 22 which is operated by a timer 24 and the motor of the timer to the neutral indicated at N. Further, when the switch 20 is closed, current can flow from $L_1$ through the switch 20 and another switch 26 (also operated by timer 24) to and through the field of coil of relay $R_3$ as well as to and through the field coil of relay $R_1$. It will be seen that I have connected a resistor 28 and a diode 30 in series between the field coil of the relay $R_1$ and the switch 26 and that I have also connected a capacitor 32 across the field coil of the relay $R_1$ to prevent its contacts from chattering. The relay $R_1$ includes a switch 34 which is closed when the relay is energized to bypass switch 20 of the relay $R_2$. When switch 34 is closed, current can flow from $L_1$ to and through the switch 22 as well as to and through the switch 26. The reasons for this will become apparent as I further describe the manner in which the timer 24 operates its switches 22, 26.

The relay, $R_3$ includes switches 36 and 38 which, respectively, energize loads 40, 42.

While I have shown a diode 16 in series with the field coil of the relay $R_2$ and a diode 30 in series with the field coil of the relay $R_1$, it will be appreciated that I may eliminate these diodes 16, 30 and use alternating current relays. For instance, the relay $R_2$ may be a 110 volt alternating current relay with a resistor, such as resistor 14, connected in series with its field coil. Similarly, the relay $R_1$ may be a 110 volt alternating current relay with a resistor such as resistor 28 connected in series with its field coil. The size of the relay $R_3$, of course, depends upon the size of the loads indicated at 40, 42. For instance, I have used my system with 20 amp loads on each leg indicated at 40, 42.

Referring now to FIG. 2, it will be seen that I have illustrated the timer 24 as including a pair of cams 44, 46 which operate, respectively, switches 22, 26. These cams 44, 46 are conventionally mounted on a shaft which is driven by the timer motor. I claim no invention in the details of the structure of the timer.

It will be seen that the switch 22 has two positions, a lower position when its cam follower drops down into the peripherally narrow notch of cam 44 and an upper position when its cam follower rides on the outer periphery of the cam, i.e., out of the notch. Switch 22, in FIG. 2, is illustrated in solid lines in its lower position, called its starting condition, and in broken lines in its upper position, called its running condition. Similarly, as illustrated, cam 46 has a lower peripheral portion 46a and an upper peripheral portion 46b so that the switch 26 is moved between its upper position illustrated in solid lines and its lower position illustrated in broken lines. I prefer that the cam 46 be of the adjustable lobe type so that the ratio of the peripheral extent of its upper surface 46b to the peripheral extent of its lower surface 46a can be selectively adjusted.

When the switch 26 is in its upper position (solid lines), and the switch 20 is closed because the relay $R_2$ is deenergized, current can flow through the switch 20, switch 26, resistor 28, diode 30 and the field coil of relay $R_1$ to close its switch 34. Further, when the switch 20 is closed and the switch 26 is in its upper position (solid lines), current can flow through the field coil of the relay $R_3$ to energize the loads 40, 42. It will be appreciated, therefore, that when the cam 46 progresses to the point where the switch 26 drops from its upper position to its lower position (broken lines), the relays $R_1$ and $R_3$ will be deenergized to open the switch 34 and to open the load switches 36, 38. Thus, when the switch 34 is opened, the motor of the timer 24 will continue to be energized by current flow from $L_1$ through the switch 22 as long as the switch 22 is in its upper position (broken lines). The motor of the timer 24 will not be deenergized then until the cam 44 has progressed to the point that the switch 22 drops from its upper position to its lower position. I prefer that the cam 44 be driven at a speed such that, by the time it has made one complete revolution to permit its switch 22 to drop, the cell 12 will again be seeing light so that the above-described sequence will not start again until dusk or until the cell does not see light. Opening or closing of the switch 20 while the cam 44 is moving about its one revolution will not affect the system 10.

Reviewing the above operational description, it will be appreciated that the system 10 is started when the cell 12 no longer sees light to cause its associated relay $R_2$ to close its contact 20. It is the closing of this contact 20 that initiates timer 24 operation which involves rotation of the cam 44 from its position illustrated in FIG. 2 to raise its switch 22 from its lower position (solid lines) to its upper position (broken lines) to keep the timer 24 motor energized continually until the cam 44 completes approximately one complete revolution. For controlling lighting for outdoor advertising, I use a timer 24 which drives the cam 44 through one revolution in 18 hours. The cam 46 is positioned on the timer camshaft so that its switch 26 is in its upper position when the timer 24 starts to be held there throughout the peripheral extent of the high portion or upper portion 46b of the cam. The cam 46, therefore, is the control cam for the relays $R_1$, $R_3$ in that these relays will stay energized throughout the selectively adjusted peripheral extent of the upper portion 46b.

Now an important feature of the above-described system is that, once the photocell 12 has served its useful function of starting the system, it is no longer involved in the operation of the system and will not again become an operable control element until the cam 44 has moved through approximately a complete revolution. This means that the system 10 will not be bothered if the cell 12 is, for any reason, exposed to light from any outside source such as lightning, spotlights, etc. during the time that the cam 44 is moving through its complete revolution. I consider this to be an extremely important feature of my system.

Referring now to FIG. 3, it will be seen that I have shown the manner in which I prefer to package my system 10, it being understood that there is no attempt in FIG. 3 to show the package or any part thereof in scale. I prefer to provide a conventional base fitting 50 which may be a conventional and commercially available fitting known in the trade as a Steber fitting. I then place my entire system 10 in a cylindrical container approximately of the same diameter as the fitting 50 and connect the container mechanically and the circuitry in the container electrically to the fitting 50 by means of a conventional twistlock connector 54 referred to in the trade as a Hubbell Twistlock connector.

It is very important to place the photocell 12 in such a position as to control the sensitivity of my system 10. I prefer to do this by providing a hollow tube 56 which extends horizontally outwardly from the container 52 and then placing the cell in the tube at a selected position therein and with its light-sensitive surface facing the outer, open end of the tube. The closer the cell 12 is to the open, outer end of the tube 56, the more sensitive it is to light. If I want to make the system 10 such that the cell 12 will not stop conducting to deenergize its associated relay $R_2$ until it is will after dusk, I can put the cell 12 rather close to the open end of the tube 56. On the other hand, if I want the system 10 to start operating right at dusk, I can put the cell 12 farther away from the open end of the tube 56. I prefer to place a pair of conventional rubber O-rings 58, 60 about the cell 12. These O-rings frictionally engage the internal wall of the tube 56 to hold the cell 12 in any selected position. I presently use and find satisfactory a tube 56 which is approximately 2 inches long and which has an internal diameter of approximately one-fourth inch.

What I claim is:

1. A control system comprising first circuit means including light-actuated means and first switch means cooperating to provide a first circuit condition in the presence of light and a second circuit condition in the absence of light, load switch means effective, when operated, to energize a load, second switch means connected in parallel with said first switch means and effective, when operated, to bypass said first switch means, and a timer including timer control switch means and load control switch means, said timer control switch means having a running condition effective directly to energize and operate said timer from a power source for a first predetermined period of time and an alternate starting condition effective to energize and initiate operation of said timer through said first switch means and said second switch means, and said load control switch means having a condition effective to operate said load switch means and said second switch means for a second predetermined period of time running during and within the time span of said first period of time and an alternate condition effective to disable said load switch means and said second switch means, said timer being arranged so that, when said timer control switch means is in its said alternate starting condition, said load control switch means is in its first said condition, said second switch means being connected to and operated by said first switch means, and said load switch means being connected to and operated through said second switch means.

2. The invention of claim 1 in which said first switch means is conducting during such second circuit condition and nonconducting during such first circuit condition, whereby said timer is started when said timer control switch means is in its starting condition and said first circuit means changes from its first condition to its second condition.

3. The invention of claim 1 in which said timer includes a constant speed motor and first and second cams operating, respectively, said timer control switch means and load control switch means, said cams being driven by said motor, said first cam having a peripherally narrow portion establishing said starting condition of said timer control switch means.

4. The invention of claim 3 in which said second cam has a first peripherally extending lobe portion establishing said first-mentioned condition of said load control switch means and a second peripherally extending lobe portion establishing said alternate condition of said load control switch means, said first lobe portion being positioned so that said first-mentioned condition exists when said timer control switch means is in its said starting condition, and in which said first switch means is conducting during such second circuit condition and nonconducting during such first circuit condition, whereby said timer is started when said timer control switch means is in its starting condition and said first circuit means changes from its first condition to its second condition.

5. The invention of claim 4 in which said first switch means includes a relay, the field coil of which is energized by current flow through said light-actuated means in the presence of light, and a contact member spring urged normally closed in opposition to said field coil, whereby, when said first circuit means changes from its first condition to its second condition, said contact member is closed to start said timer and to initiate operation of said load switch means and said second switch means.

6. The invention of claim 5 in which said light-actuated device includes a photocell having a light-responsive surface, and including a hollow open-ended tube, said photocell being selectively adjustably axially movable within said tube with its light-responsive surface facing said open end, whereby the sensitivity of said system relative to changes in light density can be selectively adjusted.

7. The invention of claim 6 in which said tube is generally horizontally extending.

8. The invention of claim 1 in which said light-actuated device includes a photocell having a light-responsive surface, and including a hollow open-ended tube, said photocell being selectively adjustably axially movable within said tube with its light-responsive surface facing said open end, whereby the sensitivity of said system relative to changes in light density can be selectively adjusted.

9. The invention of claim 7 in which said photocell and said tube are generally cylindrical in cross section and including at least one rubberlike ring peripherally attached to said photocell and frictionally engaging the internal wall of said tube.